(12) United States Patent
Egan et al.

(10) Patent No.: US 9,521,703 B2
(45) Date of Patent: Dec. 13, 2016

(54) MULTIPLE ABSTRACTION LAYERS WITHIN A COMMUNICATION DEVICE

(71) Applicant: MARVELL WORLD TRADE LTD., St. Michael (BB)

(72) Inventors: John Egan, Palm Harbor, FL (US); Abdelrazak Younes, St. Prex (CH); Marcos Martinez-Vazquez, Barcelona (ES)

(73) Assignee: Marvell World Trade Ltd., St. Michael (BB)

(*) Notice: Subject to any disclaimer, the term of this patent is extended or adjusted under 35 U.S.C. 154(b) by 334 days.

(21) Appl. No.: 13/916,196

(22) Filed: Jun. 12, 2013

(65) Prior Publication Data

US 2013/0331094 A1 Dec. 12, 2013

Related U.S. Application Data

(60) Provisional application No. 61/658,880, filed on Jun. 12, 2012, provisional application No. 61/659,347, filed on Jun. 13, 2012.

(51) Int. Cl.
*H04W 88/06* (2009.01)
*H04L 29/06* (2006.01)
*H04L 29/08* (2006.01)

(52) U.S. Cl.
CPC ............. *H04W 88/06* (2013.01); *H04L 69/18* (2013.01); *H04L 69/32* (2013.01)

(58) Field of Classification Search
CPC ...... H04W 88/06; H04W 92/02; H04W 88/02; H04W 68/00; H04W 76/02
USPC ............ 455/426.1, 426.2; 370/467, 328, 338
See application file for complete search history.

(56) References Cited

U.S. PATENT DOCUMENTS

| | | | |
|---|---|---|---|
| 8,321,194 B2* | 11/2012 | Meagher | H02J 13/001 700/286 |
| 2005/0251604 A1 | 11/2005 | Gerig | |
| 2009/0125604 A1* | 5/2009 | Chang | H04L 69/166 709/212 |
| 2009/0196163 A1 | 8/2009 | Du | |
| 2009/0252090 A1* | 10/2009 | Xu | H04W 76/025 370/328 |

(Continued)

OTHER PUBLICATIONS

IEEE P1905.1™/D09, P1905.1TM/D09 Draft Standard for a Convergent Digital Home Network for Heterogeneous Technologies, The Institute of Electrical and Electronics Engineers, Inc., Dec. 13, 2012.

(Continued)

*Primary Examiner* — Cong Tran

(57) ABSTRACT

In a method of processing data in a communication device operating in a heterogeneous communication network, data is transferred between a first communication interface within the communication device and an upper protocol layer via a first abstraction layer (AL) processing unit. The first AL processing unit is dedicated to the first communication interface. Additionally, data is transferred between the first AL processing unit and a second AL processing unit within the communication device via an interface between the first AL processing unit and the second AL processing unit. The first AL processing unit is dedicated to a second communication interface within the communication device.

18 Claims, 5 Drawing Sheets

(56) References Cited

U.S. PATENT DOCUMENTS

| | | | |
|---|---|---|---|
| 2011/0238881 A1* | 9/2011 | Rofougaran | 710/303 |
| 2011/0268025 A1* | 11/2011 | Sunder Rajan et al. | 370/328 |
| 2012/0243556 A1* | 9/2012 | Yen et al. | 370/467 |
| 2012/0311683 A1* | 12/2012 | Klein | H04L 63/06 726/6 |
| 2013/0322445 A1* | 12/2013 | Klein | H04L 12/5692 370/392 |
| 2014/0226628 A1* | 8/2014 | Helbert | H04M 7/1225 370/331 |
| 2015/0127983 A1* | 5/2015 | Trobough | G06F 11/267 714/30 |

OTHER PUBLICATIONS

IEEE P1905.1™-2013, IEEE Draft Standard for a Convergent Digital Home Network for Heterogeneous Technologies, The Institute of Electrical and Electronics Engineers, Inc., Mar. 6, 2013.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5GHZ Band," *The Institute of Electrical and Electronics Engineers, Inc.*, 91 pages (1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, 23 pages, Nov. 7, 2001.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

van Nee, et al. "The 802.11 n MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6GHz," *The Institute of Electrical and Electronics Engineers, Inc.*, Jan. 2012.

IEEE Std 802.11ac/D2.1 "Draft Standard for Information Technology—Telecommunications and information exchange between sysetms—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

IEEE Std 802.11v™/D14.0 "Draft Standard for Information technology—Telecommunications and information exchange between

(56) References Cited

OTHER PUBLICATIONS systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, (Aug. 2010).

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Mar. 8, 2002.

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, , Sections 1-5, Dec. 9, 2005.

IEEE Draft P802.3ae/D5.0 "Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation," *The Institute of Electrical and Electronics Engineers, Inc.*, May 1, 2002.

International Preliminary Report on Patentability in International Application No. PCT/US2013/045424, dated Dec. 24, 2014 (6 pages).

IEEE Std. 1905.1™-2013, "IEEE Standard for a Convergent Digital Home Network for Heterogenous Technologies," *IEEE Communications Society, Power Line Communications Standards Committee*, 90 pages. (Mar. 6, 2013).

International Search Report and Written Opinion in corresponding application No. PCT/US2013/45424 mailed Sep. 20, 2013.

P1905.1/D05 Draft Standard for a Convergent Digital Home Network for Heterogeneous Technologies, IEEE P1905.1/D05, May 5, 2012.

ITU-T Draft OIS: G.hn: Outgoing Liaison to IEEE Nescom, Study Group 15, TD445 (WP1/15) Geneva, Switzerland, Feb. 14-25, 2011.

\* cited by examiner

MULTIPLE ABSTRACTION LAYERS WITHIN A COMMUNICATION DEVICE

CROSS-REFERENCE TO RELATED APPLICATIONS

This disclosure claims the benefit of U.S. Provisional Patent Application Nos. 61/658,880, filed Jun. 12, 2012, entitled "Multiple 1905.1 Abstraction Layers Within a Single System" and 61/659,347, filed Jun. 13, 2012, entitled "Multiple 1905.1 Abstraction Layers Within a Single System," the disclosures of both of which are hereby expressly incorporated herein by reference in their entireties.

FIELD OF TECHNOLOGY

The present disclosure relates generally to communication networks, and more particularly, to a communication network configured to operate using multiple heterogeneous communication technologies.

DESCRIPTION OF THE RELATED ART

Communication networks, such as home communication networks created in consumer homes or industrial communication networks in the workplace, are continually evolving. New ways of transmitting data, using various communication media, have been developed and are often employed simultaneously in such networks. For example, wireless communication channels are utilized for delivery of data to wireless devices, such as cell phones or tablets, while power lines are utilized for delivery of data to devices connected to power outlets, such as televisions or gaming systems in the home. In some instances, multiple communication technologies are employed within a single communication device, for example to increase link reliability in the communication device and/or to increase throughput rates of data delivery to the communication devices within the network. For example, a communication device connected to an internet router via a wireless connection and a powerline connection may be receiving internet content from the router via the wireless connection, but may be fully or partially switched to receiving the content via the powerline connection when the wireless link becomes unavailable or when capacity of the wireless link for transmission to the communication device diminishes.

Some standards, communication protocols and the like have been developed to help integrate devices that employ communication over disparate communication media into a heterogeneous network. For example, the recently approved Institute for Electrical and Electronics Engineers (IEEE) 1905.1 Standard aims to abstract heterogeneous media protocols from upper layer protocols in a communication device, and also simplifies integration of devices into a heterogeneous network by providing such functions as automatic device discovery, link metrics, path selection and other network related functions for efficient communication between communication devices within the heterogeneous network.

SUMMARY OF THE DISCLOSURE

In an embodiment, a communication device comprises a plurality of communication interfaces, each communication interface configured to operate according to a respective communication protocol. The communication device also comprises a plurality of abstraction layer (AL) processing units. Each AL processing unit coupled to a respective communication interface of the plurality of communication interfaces and is configured to abstract the corresponding communication protocol from an upper layer processing unit. Each AL processing unit includes a respective interface for communicating with other AL processing units within the communication device.

In other embodiments, the communication device includes any combination of one or more of the following features.

Each AL processing unit of the plurality of AL processing units is configurable to operate either (i) in master mode or (ii) in slave mode with respect to the other AL processing units within the communication device.

A first AL processing unit of the plurality of processing units is configured to operate in master mode and a second AL processing unit of the plurality of processing units is configured to operate in slave mode.

The first AL processing unit supports a set of control messages and the second AL processing unit supports a subset of the set of control messages supported by the first AL processing unit.

The communication device further comprises a central database accessible by each AL processing unit of the plurality of AL processing units, wherein the database stores at least (i) forwarding data and (ii) link data describing quality of active links associated with the communication device.

The first AL processing unit includes the database.

The communication device further comprises an arbitration unit configured to (i) select, from the plurality of communication interfaces, a communication interface via which to transmit data received from the higher level processing unit and (i) cause the data to be forwarded to the AL processing unit associated with the selected communication interface.

The first AL processing unit includes the arbitration module.

The upper protocol layer is a logical data link layer.

In another embodiment, a method of processing data in a communication device operating in a heterogeneous communication network includes transferring data between a first communication interface within the communication device and an upper protocol layer via a first abstraction layer (AL) processing unit, wherein the first AL processing unit is dedicated to the first communication interface. The method additionally includes transferring data between the first AL processing unit and a second AL processing unit within the communication device via an interface between the first AL processing unit and the second AL processing unit, wherein the first AL processing unit is dedicated to a second communication interface within the communication device.

In other embodiments, the method includes any combination of one or more of the following elements.

The method further includes selecting the first communication interface or the second communication interface for transmitting data from the communication device, and in response to selecting the first communication interface, forwarding the data to the first AL processing unit, and in response to selecting the second communication interface, forwarding the data to the second AL processing unit.

Selecting the communication interface includes accessing a central database that stores at least (i) forwarding data and (ii) link data describing quality of active links associated with the communication device, and selecting between the first communication interface and the second communication interface based on information stored in the central database.

The method further includes configuring the first AL processing unit to operate in a mater mode and configuring the second AL processing unit to operate in a slave mode.

The method further includes receiving a discovery message from another communication device in the communication network, and responding to the discovery message using the first AL processing unit.

In yet another embodiment, an apparatus for communication in a heterogeneous network, the heterogeneous network including a plurality of disparate communication media types comprises a communication interface configured for communication over one of the communication media types. The apparatus additionally comprises an abstraction layer (AL) processing unit coupled to the communication interface, the AL processing unit configured to abstract the communication interface from an upper layer processing unit, wherein the AL processing unit includes an interface for communicating with other AL processing units within a communication device.

In other embodiments, the apparatus includes any combination of one or more of the following features.

The AL processing unit is configurable to operate in a master mode or in a slave mode within the communication device.

When the AL processing unit is configured to operate in a master mode, the AL processing unit supports a set of control messages.

When the AL processing unit is configured to operate in the slave mode, the AL processing unit supports a subset of the set of control messages.

The AL processing unit further comprises a central database accessible by other AL processing units within the communication device.

The central database is (i) enabled when the AL processing unit is configured to operate in the master mode and (ii) disabled when the AL processing unit is configured to operate in the slave mode.

The AL processing unit further comprises an arbitration module configured to arbitrate operation of a plurality of AL processing units within the communication device, wherein the arbitration module is (i) enabled when the AL processing unit is configured to operate in the master mode and (ii) disabled when the AL processing unit is configured to operate in the slave mode.

The upper protocol layer is a logical data link layer.

In still another embodiment, a method of communicating in a heterogeneous network, the heterogeneous network including a plurality of disparate communication media types includes receiving data via a first communication interface of a communication device, the first communication interface configured to communicate over a first communication media type. The method also includes forwarding the data to a first abstraction layer (AL) processing unit, wherein the first AL processing unit is configured to abstract the first communication interface from an upper layer processing unit. The method additionally includes forwarding the data from the first AL processing unit to a second AL processing unit via an interface between the first AL processing unit and the second AL processing unit within the communication device. The second AL processing unit is configured to abstract a second communication interface from the upper layer processing unit. The second communication interface is configured to communicate over a second communication media type.

In other embodiments, the method includes any combination of one or more of the following elements.

The method further includes configuring the first AL processing unit to operate in master mode and configuring the second AL processing unit to operate in slave mode.

The method further includes receiving a discovery message from another communication device in the communication network, and responding to the discovery message using only the first AL processing unit.

DETAILED DESCRIPTION

Figure 1:
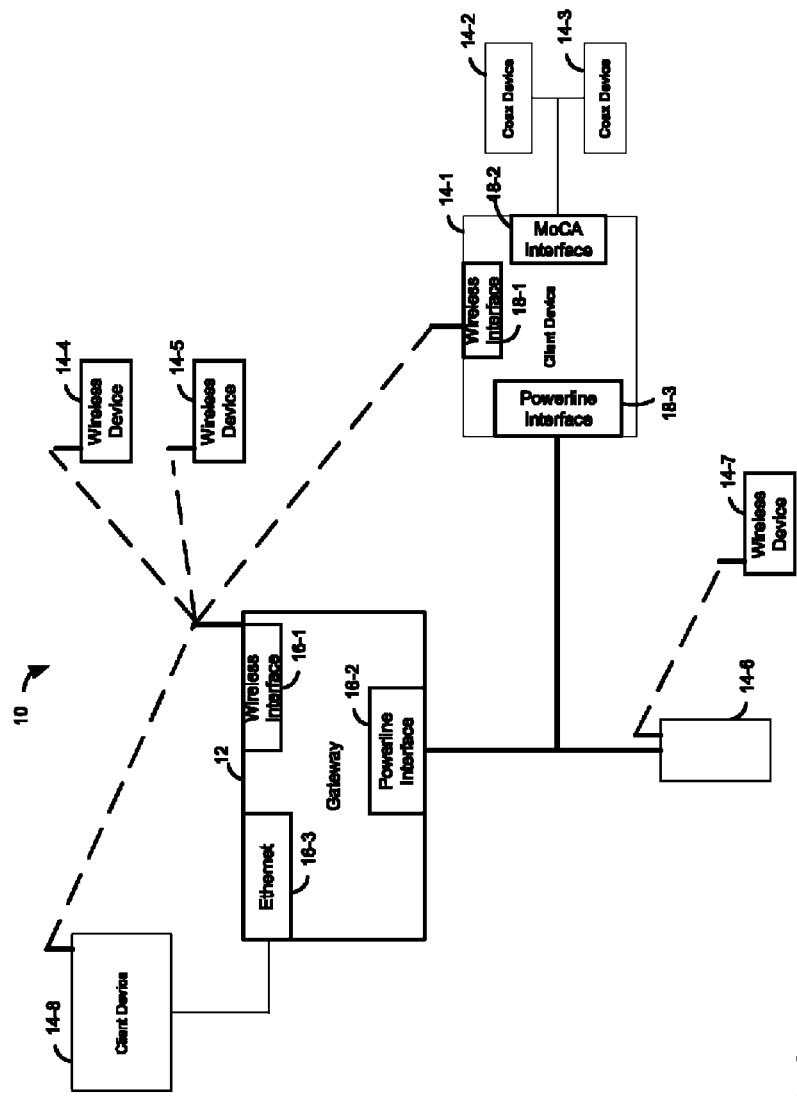
FIG. 1 is an example diagram of a heterogeneous communication, according to an embodiment.

FIG. 1 is an example diagram of a heterogeneous communication network 10, according to an embodiment. The network 10 is a home network that connects various communication devices (e.g., cellular phones, tablets, laptops, personal computers (PCs), set-top boxes, televisions (TVs), gaming systems, etc.) within the home, in an embodiment. In other embodiments, the communication network 10 connects various communication devices in other settings, such as in the workplace, for example. In an embodiment, the network 10 is a "convergent network" in which one or more communication devices communicate using several different communication technologies for communicating via disparate communication media. The network 10 includes a gateway device 12 and a plurality of client devices 14 configured to communicate with the gateway device 12 and/or with other client devices 14 over the network 10. The gateway 12 includes a plurality of communication interfaces 16, and each of the communication interfaces 16 is configured to communicate with the client devices 14 (e.g., to transmit data such as, internet content, video streaming content, etc. to the client devices 14) via a respective communication media over the network 10. In the example embodiment of FIG. 1, the gateway 12 includes a first interface 16-1 configured to communicate over wireless communication media (e.g., according to a Wi-Fi communication protocol), a second interface 16-2 configured to communicate over power line communication media (e.g., according to a HomePlug® powerline alliance for broadband over powerline (BoP) communication protocol), and a third communication interface 16-3 configured for wired Ethernet communication (e.g., according to an Ethernet communication protocol). Although the gateway 12 is illustrated in FIG. 1 as having three communication interfaces 16, the gateway 12 includes other numbers of interfaces (e.g., 1, 2, 4, 5, etc.), in other embodiments. Further, communication interfaces included in the gateway 16 are configured to communicate using any suitable communication media, including but not limited to Ethernet, wireless (e.g., WLAN, Wi-Fi, etc.), broadband over powerline, media over coax, other suitable wireless or wired communication media, etc.

Each of the client devices 14 includes one or more communication interfaces for communicating with the gateway 12 (e.g., for receiving content data from the gateway 12) and/or with the other client devices 14 within the network 10 using one or more communication media types. For example, the client device 14-1 includes a first communication interface 18-1 configured to communicate over wireless communication media (e.g., according to a Wi-Fi communication protocol), a second communication interface 18-2 configured to communicate over a multimedia over coax cable communication media (e.g., according to a multimedia over coax alliance (MoCA) communication protocol), and a third communication interface 18-3 configured for broadband over powerline communication. Although the client device 14-1 is illustrated in FIG. 1 as having three communication interfaces 18, the client device 14-1 includes other numbers of interfaces (e.g., 1, 2, 4, 5, etc.), in other embodiments. Further, communication interfaces included in the client device 14-1 are configured to communicate using any suitable communication media, including but not limited to Ethernet, wireless (e.g., WLAN, Wi-Fi, etc.), broadband over powerline, media over coax, other suitable wireless or wired communication media, etc.

In an embodiment, one or all of the client devices 14-2-14-8, have a structure the same as or similar to the client device 14-1. In these embodiments, the client devices 14-2-14-8 structured the same as or similar to the client device 14-1 have the same or a different number of communication interfaces as the client device 14-1. For example, each of the client devices 14-6 and 14-8 is a dual-interface device having two communication interfaces, each of client devices 14-4, 14-5, and 14-7 is a wireless device having only a wireless communication interface, each of the client devices 14-2 and 14-3 is a coaxial line communication device having only a coaxial line communication interface. Further, although the communication network 10 is illustrated in FIG. 1 as including eight client devices 14-1-14-8, the communication network 10 includes other suitable numbers (e.g., 1, 2, 3, 4, 5, 6, 7, 9, etc.) of client devices 14 in other embodiments.

According to an embodiment, the gateway 12 and one or more of the client devices 14 are configured to operate according to a convergent network communication protocol that defines an abstraction of operation of different communication technologies from upper protocol layers within the gateway 12 and the one or more client devices 14. For example, in an embodiment, the gateway 12 and the one or more of the client device 14 are configured to operate according to the Institute for Electrical and Electronics Engineers (IEEE) 1905.1 Standard, or another suitable convergent network communication protocol. In some embodiments, the gateway 12 and the one or more of the client device 14 further rely on the convergent network communication protocol to simplify operation of the network 10. For example, the gateway 12 and the one or more of the client device 14 utilize the convergent network communication protocol to discover other devices within the network 10 that are configured to operate according to the convergent network communication protocol within the network 10, to determine types of connections that are available for communication with other the other devices within the network 10, to maintain link data for active links between devices in the network 10, to dynamically select appropriate or best links from transmission of data to devices in the network 10, etc.

Figure 2:
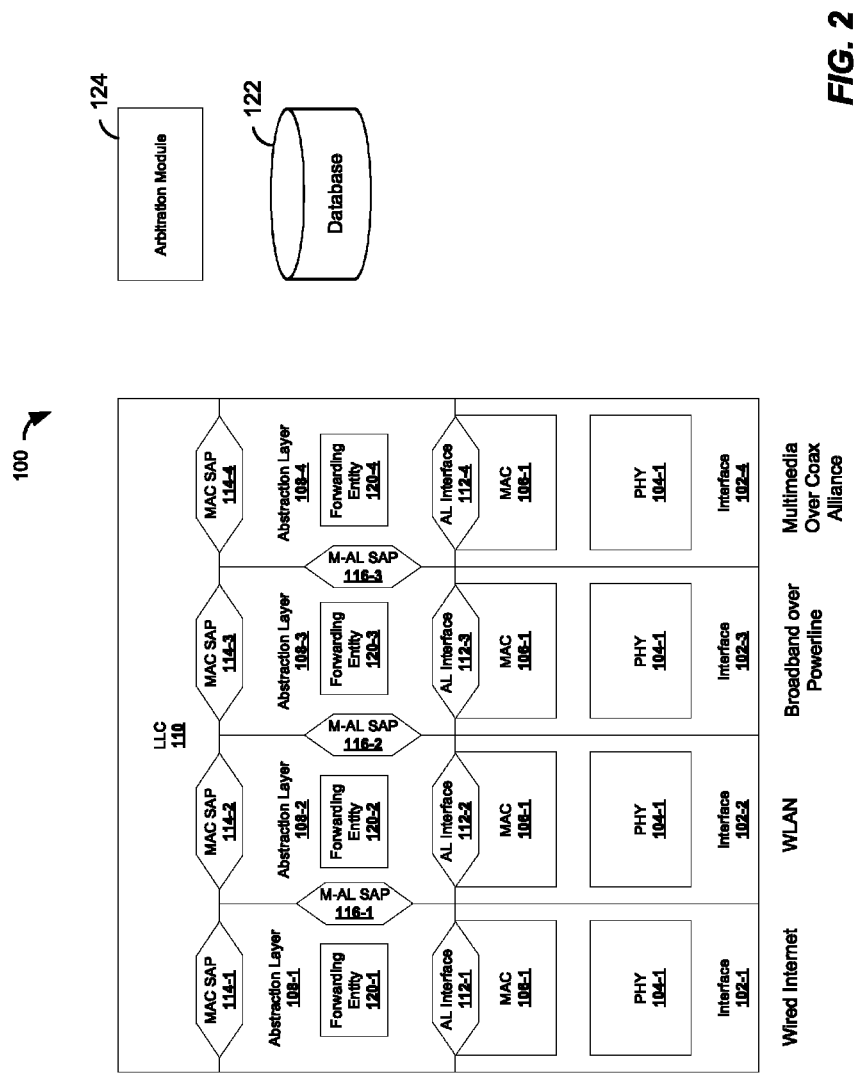
FIGS. 2 and 3 are diagrams illustrating portions of an example implementation of a communication device, according to an embodiment.
Figure 3:
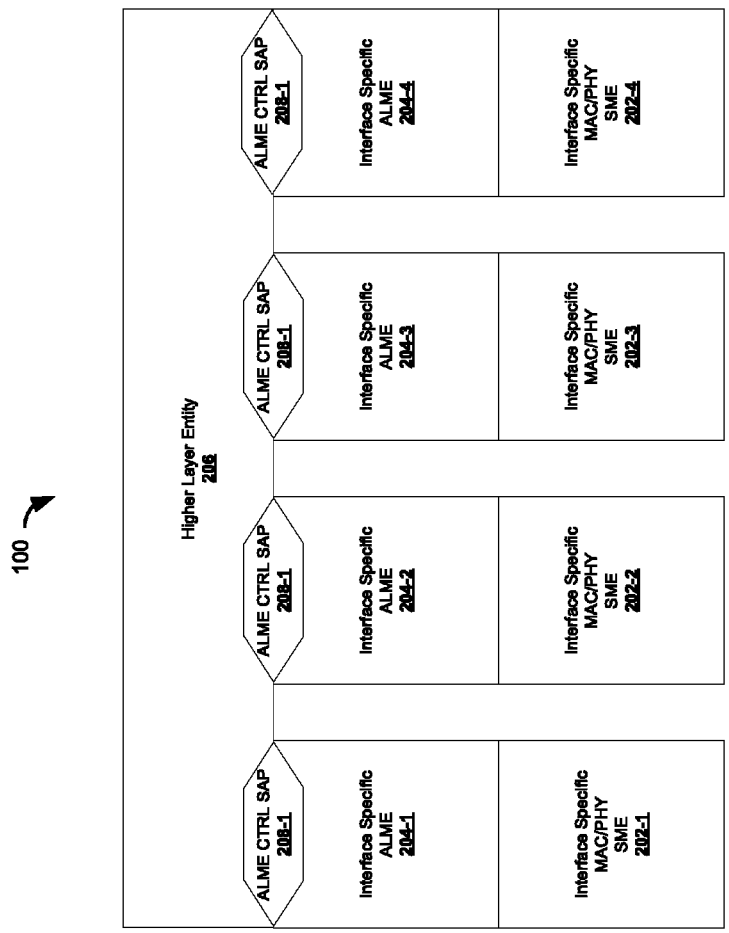

FIGS. 2 and 3 are diagrams illustrating an example implementation of a communication device 100, according to an embodiment. In particular, FIG. 2 illustrates "data plane" configuration of the communication device 100 and FIG. 3 illustrates "control/management plane" configuration of the communication device 100. In an embodiment, the communication device 100 operates within the network 10 of FIG. 1. For example, the communication device 100 corresponds to the gateway 12, to a client device 14, to another device operating within the network 10, etc., in various embodiments. In other embodiments, the communication device 100 operates in a network other than the network 10. Similarly, the gateway 12 and/or the client devices 14 are implemented in suitable ways different than the communication device 100, in some embodiments.

Referring first to FIG. 2, the communication device 100 includes a plurality of communication interfaces 102, and each communication interface 102 supports communication over a respective communication media type. For example, the communication interface 102-1 supports wired internet (e.g., Ethernet) communication and operates according to a wired internet communications protocol, such as an IEEE 802.3 Standard, the communication interface 102-2 supports wireless local area network (WLAN) communication and operates according to a WLAN communication protocol, such as an IEEE 802.11 Standard, the communication interface module 102-3 supports broadband over powerline (BPL) communication and operates according to a BPL communications protocol, such as an IEEE 1901 Standard, and the communication interface 102-4 supports multimedia over coax alliance (MoCA) communication and operates according to a coax alliance communication protocol. Although the communication device 100 is illustrating four communication interfaces 102, the communication device 100 includes other suitable numbers (e.g., 1, 2, 3, 5, etc.) of communication interfaces 102 in other embodiments. Further, the communication interfaces 102 are generally configured to operate over any suitable communication media and according to any suitable communication protocols.

In an embodiment, each communication interface 102 includes a respective physical layer (PHY) processing unit 104 and a respective medium access control (MAC) processing unit 106. Additionally, each communication interface 102 includes or is coupled to a respective abstraction layer processing unit 108. The abstraction processing units 108 are configured according to a convergent network communication protocol (e.g., the IEEE 1905.1 Standard), according to an embodiment. Generally speaking, the abstraction layer processing units 108 abstract operation of the disparate interfaces 102 from an upper protocol layer of a protocol stack used in the communication device 100, such as a logic link control layer (LLC) 110. In an embodiment, the AL processing units 108 comprise a protocol layer (or sub-layer) that lies between MAC layer and LLC layers of the protocol stack used by communication device 100 and acts to abstract different communication technologies of the interfaces 102 from an upper protocol layer, such as the LLC 110, making the upper protocol layer agnostic to the specific communication protocols according to which the interfaces 102 operate.

In an embodiment, each AL processing unit 108 is provided by a same vendor or manufacturer as the vendor or manufacturer that provides the corresponding interface 102. As a result, in this embodiment, the AL processing units 108 are able to support vendor specific messaging, such as vendor specific type length value (TLV) elements, and are able to forward the vendor specific messages from each of the interfaces 108 to the LLC 10, providing better integration of the interfaces 102 in the communication device 100 and better overall operation of the communication device 100 compared to a device that includes a single AL processing unit for abstracting interfaces provided by different vendors from the LLC 110, in at least some situations. In some embodiments, a single AL processing unit 108 is coupled to two or more communication interfaces 102 when the two or more of the communication interfaces 102 are provided by a same manufacturer or vendor. For example, if the interface 102-1 and the interface 102-2 are provided by the same vendor, the AL processing unit 108-1 and the AL processing unit 108-2 are replaced by a single AL processing unit 108 (not shown) coupled to both the interface 102-1 and the interface 102-2, in an embodiment.

In various embodiments, the AL processing units 108 are capable of efficiently operating within the communication device 100 by exchanging data and messages (e.g., control and/or management messages) with other AL processing units 108 within the communication device 100. Further, in an embodiment, the AL processing units 108 share or have access to a common memory space used to store data, such as forwarding data, available path information, link quality information, etc., needed or desired for operation of the communication device 100 within a network, such as the network 10 (FIG. 1). Because a common memory space is provided for access by all AL processing units 108, multiple memories need not be provided for individual use by each of the processing units 108, generally increasing efficiency of integration of multiple interfaces within the device 100, in at least some embodiments. Further, in some embodiments, a central arbitration module, coupled to the central database, governs operation of the multiple AL processing units 108 within the device 100, as will be explained in more detail below.

In the embodiment of FIG. 2, each AL processing unit 108 includes a respective abstraction layer interface 112 for communicating with the corresponding interface 102 (e.g., coupled to the MAC processing unit 106 of the corresponding interface 102), a respective MAC service access point (MAC SAP) interface 114 for communicating with the LLC 110, and a respective multi-AL SAP (M-AL SAP) interface 116 for communicating with the other AL processing units 108 within the communication device 100. In various embodiments, each AL processing unit 108 is configured to exchange data and/or other information (e.g., control messages, other messages, etc.) with the other AL processing units 108 within the communication device 100 via the M-AL SAP interfaces 116. In the embodiment of FIG. 2, each AL processing unit 108 is configured to communicate with a neighboring AL processing unit 108 via a corresponding M-AL SAP interface 116 between the neighboring AL processing units 108. For example, each AL processing unit 108 is capable of sending data and/or other information to a neighboring AL processing unit 108 via a corresponding M-AL SAP 116. The AL processing unit 108 that receives data or other information from a neighboring AL processing unit 108 either forwards the data or other information to the MAC processing unit 106 coupled to the AL processing unit 108 for transmission of the data or other information via the corresponding interface 102, or forwards the data or other information to the following AL processing unit 108. For example, in an example scenario, the AP unit 108-1 receives data from the MAC processing unit 106 and forwards the data to the AL processing unit 108-2 via the M-AL SAP 116-1, in an embodiment. In this embodiment, the AL 108-2 sends the data to the MAC processing unit 106-2 for subsequent transmission of the data via the interface 102-2, or forwards the data to the AL processing unit 108-3 via the M-AL SAP 116-2. In another embodiment, each AL processing unit 108 includes a plurality of M-AL SAPs, and each of the plurality of M-AL SAPs is configured to communicate with a respective AL processing unit 108 within the communication device 100. For example, the AL processing unit 108-1 includes a first M-AL SAP to communicate with the AL processing unit 108-2, a second M-AL SAP to communicate with the AL processing unit 108-3, and a third M-AL SAP to communicate with the AL processing unit 108-4, in an embodiment.

Referring briefly to FIG. 3, this figure is a block diagram illustrating control/management plane configuration of the communication device 100. In the illustrated configuration, each interface 102 of the communication devices 100 includes a respective station management entity unit 202 that generally controls and/or manages operation of the corresponding PHY processing unit 104 and the corresponding MAC processing unit 106. Further, within the abstraction layer configuration of the communication device 100, each AL processing unit 108 includes a respective abstraction layer management unit 204 that interfaces with the corresponding SME unit 202 in the interface 102 associated with the AL processing unit 108. Each ALME unit 204 is configured to communicate with other ALME units 204 within the communication device 100 via the M-AL SAP interfaces 116, in an embodiment, In another embodiment, dedicated interfaces other than the M-AL SAP interfaces 116 are provided for communication between the ALME units 204. Further, each ALME unit 204 interfaces with a higher layer management entity (HLE) unit 206, which is included in the LLC processing unit 110, in an embodiment. The ALME processing units 204 generally implement control and/or management functions within the communication device 100 and/or within the network within which the communication device 100 is operating (e.g., the network 10 of FIG. 1). For example, in various embodiments, the ALME units 204 are generally operative to discover other devices within the network, to collect and maintain link quality information for connections with other devices within the network, to respond to discovery messages from other devices within the network, etc. In some embodiments, the AL processing units 108 are configurable (e.g., to operate in master mode or in slave mode within the network device 100) such that only one of the ALME units 204 within the communication device 100 operates to implement certain network related functions, such as discovery device functions, network topology functions, etc., as will be explained in more detail below)

Referring back to FIG. 2, the AL processing units 108 are integrated within the communication device 100 to act as a single AL processing unit with respect to the network within which the device 100 operates, in some embodiments. For example, in an embodiment, each of the AL processing units 108 is configurable to operate in either a "master" mode or a "slave" mode with respect to other AL processing units 108. In an embodiment, each AL processing unit 108 includes a bit setting, such as a register, configurable to select a master or a slave mode for the AL processing unit 108. In this embodiment, a device operator or a system architect of the communication device 100 configures one of the AL processing unit 108 (e.g., AL 108-1) to operate as a master by setting an appropriate bit (or bits) within the AL processing unit 108 to configure the processing unit 108 to operate as a master AL processing unit. Additionally, the device operator or the system architect sets appropriate bit (or bits) in the remaining AL processing units 108 (e.g., each of AL 108-2, AL 108-3, and AL 108-4) to configure each of the remaining AL processing units 108 to operate in slave mode, in an embodiment.

Alternatively, selection of a master AL processing unit 108 is automatic based on a type of interface 102 associated with the AL processing unit 108, in another embodiment. For example, a priority order is defined for the types of interfaces supported within the network 10, and an AL processing unit 108 associated with an interface of higher priority is automatically selected to operate as a master, in some embodiments. For example, in one embodiment, a communication interface configured to communicate over WLAN is given a highest priority, followed by BoP communication interface, followed by MoCA communication interface, followed by wired (e.g., Ethernet) communication interface, in an example embodiment. In this embodiment, if a communication device includes a WLAN interface, then the AL processing unit associated with the WLAN interface is automatically selected to operate in master mode, and the remaining AL processing units (if the communication device includes any additional interfaces) are automatically selected to operate in slave mode. If the communication device does not include a WLAN interface, but includes a BoP interface, then the AL processing unit associated with the BoP interface is automatically selected to operate in master mode, and the remaining AL processing units (if the communication device includes any additional interfaces) are automatically selected to operate in slave mode, and so on. In other embodiments, other suitable priority orders are defined for automatic selection of a master AL processing unit. Of course, if a communication device is a single interface device that includes only one type of interface, then the AL processing unit associated with the interface operates in master mode, in an embodiment.

In any event, in a typical configuration, one of the AL processing units 108 is configured to operate as a master (i.e., in master mode) and the remaining AL processing units 108 are configured to operate as slaves (i.e., in slave mode), according to an embodiment. In an embodiment, a master AL processing unit 108 generally operates in a "full" functionality mode, while a slave AL processing unit 108 operates in a "degraded" functionality mode. For example, a master AL processing unit 108 is configured to support a set of control and/or management messages and message exchanges defined by the convergent network communication protocol, while the slave AL processing unit supports only a subset of such messages or supports none of such messages, in some embodiments. In such embodiments, all or most network related functions are carried out using the master AL processing units. As an example, when a discovery message is received at the communication device 100 from another device in the network within which the device 100 operates, the master AL processing unit 108 (e.g., the ALME units 204 associated with the master AL processing unit 108) generates and transmits a discovery response message to other devices within the network. In some embodiments, operation in slave mode results in power savings in AL processing units 108 that are configured to operate as slaves within the communication device 100. In some embodiments, an AL processing unit 108 is pre-configured to operate only in slave mode. In this case, the AL processing unit 108 need not implement all functionality needed for master mode operation, resulting in power and/or area reduction in such degraded functionality AL processing units compared to fully functional and/or configurable AL processing units.

In an embodiment, the communication device 100 includes a central database 122, such as a memory, accessible by each of the AL processing units 108. The database 122 is included in a master AL processing unit 108 (e.g., the AL processing unit 108 that is configured to operate is master mode), according to an embodiment. In another embodiment, each AL processing unit 108 includes a respective database 122, but use of the database 122 is enabled in the master AL processing unit 108 and is disabled in the slave AL processing units 108. In other embodiments, the database 122 is included in the upper protocol layer of the communication device 100, such as in the LLC 110, or is provided as a separate memory in the communication device 100. The database 122 is used, for example, to store forwarding information, such as addresses of other devices to which the communication device 100 is connected within the network 10, in an embodiment. Additionally or alternatively, the database 122 is used to store additional information needed or desired for making forwarding decisions in regard to data transmitted from the communication device 100, in some embodiments. For example, in an embodiment, the database 122 is used to store link data (e.g., obtained by the ALME units 204) describing various links between the communication device 100 and other devices within the network 10. Such link data is utilized for dynamically selecting an appropriate link for transmission of data from the communication device 100, in at least some embodiments. For example, when the communication device 100 is capable of communicating with another device within the network 10 using either a wired internet connection via the interface 102-1 or a wireless connection via the interface 102-2, a best link for transmission of data from the communication device 100 to the other device based on link quality of each of the connections available for transmitting data to the other communication device, in an embodiment.

In some embodiments, each of the AL processing units 108 includes a respective forwarding entity 120 configured to make certain forwarding decisions with respect to the corresponding Al processing unit 108. For example, a forwarding entity 120 makes forwarding decisions in regard to data that the AL processing unit 108 receives from the LLC 110 and/or in regard to data that the AL processing unit 108 receives from the corresponding interface 102, in some embodiments. In an embodiment, a forwarding entity 120 accesses the database 122 and makes a forwarding decision based on information (e.g., quality of service (QoS) information, link data, etc.) stored in the database 122. For example, a forwarding entity 120 makes a determination whether to send the received data to a corresponding interface 102 for transmission via the interface 102 or whether to forward the data to another AL processing unit 108 for subsequent transmission of the data via another interface 102, according to an embodiment. In some embodiments, the forwarding units 120 are omitted from some or all of the AL processing units 108, and forwarding decisions are made by other entities in the communication device 100, such as by a forwarding entity within the LLC 110.

In an embodiment, the communication device 100 further includes an arbitration module 124. The arbitration module 124 is included in a master AL processing unit 108, according to an embodiment. In another embodiment, each AL processing unit 108 includes an arbitration module 124, but the arbitration module 124 is enabled in the master AL processing unit 108 and is disable in the slave AL processing unit (or units) 108. In other embodiments, the arbitration module 124 is included in the upper protocol layer of the communication device 100, such as in the LLC 110, or is provided as a separate processing unit in the communication device 100. The arbitration module 124 is coupled to the database 122 and is configured to utilize information stored in the database 124 to arbitrate among the multiple AL processing units 108, in an embodiment. For example, the arbitration module 124 is configured to select an interface 102 via which data should be transmitted from the communication device 100, in an embodiment. In an embodiment, the arbitration module 124 is configured to dynamically select an interface 102 for transmitting data from the communication device 100 based on QoS criteria defined for certain types of traffic, bandwidth required for transmission of traffic, current load of available links between the communication device 100 and the device to which the traffic is being transmitted, etc. Upon selecting an interface 102 via which traffic should be transmitted, the arbitration module 124 directs traffic from the LLC 110 to the AL module 108 coupled to the selected interface 102, in an embodiment. In some embodiments in which respective forwarding entities 120 are included in the AL processing units 108, the arbitration module 124 governs operation of the forwarding units 120.

Figure 4:
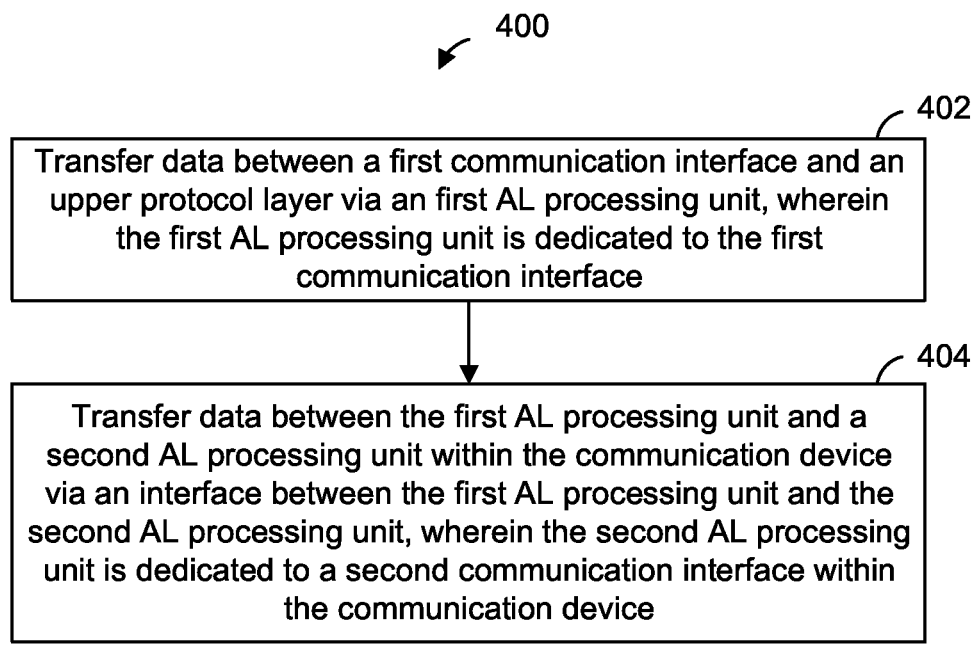
FIG. 4 is a flow diagram of an example method for operating a plurality of disparate communication interfaces within a communication device, according to an embodiment.

FIG. 4 is a flow diagram of an example method 400 of processing data in a communication device operating in a heterogeneous communication network, according to an embodiment. With reference to FIG. 1, the method 400 is implemented by the gateway 12, in an embodiment. With continued reference to FIG. 1, in another embodiment, the method 400 is implemented by a client device 14 (e.g., the client device 14-1). As another example, referring to FIGS. 2 and 3, the method 400 is implemented by the communication device 100. In other embodiments, the method 400 is implemented by other suitable communication devices. For ease of explanation, the method 400 is described below as being performed by the communication device 100 of FIGS. 2 and 3.

At block 402, data is transferred between a first communication interface of the communication device and an upper protocol layer processing unit of the communication device via a first AL processing unit. For example, data is transferred between the communication interface 102-1 and the LLC 110 of the communication device 100 via the AL processing unit 108-1, in an embodiment. In an embodiment, the first AL processing unit is dedicated to the first communication interface. In an embodiment, the first AL processing unit abstracts operation of the first communication interface from the upper protocol layer processing unit. In one embodiment and or scenario, data transferred between the first communication interface and the upper layer processing unit is data received via the network at the first communication interface. In another embodiment and/or scenario, data transferred between the first communication interface and the upper layer processing unit is control data generated within the first communication interface.

At block 404, data is transferred between the first AL processing unit and a second AL processing unit within the communication device via an interface between the first AL processing unit and the second AL processing unit within the communication device. In an embodiment, the second AL processing unit is dedicated to a second communication interface within the communication device. For example, data is transferred between the AL processing unit 108-1 and one of the AL processing units 108-2, 108-3 or 108-4 of the communication device 100, in an embodiment. In one embodiment and or scenario, data transferred from the first AL processing unit to the second AL processing unit is data received via the network at the first communication interface and forwarded from the first communication interface to the first AL processing unit. In another embodiment and/or scenario, data from the first AL processing unit to the second AL processing unit is control data generated within the first AL processing unit, or control data generated within the first AL processing unit.

Figure 5:
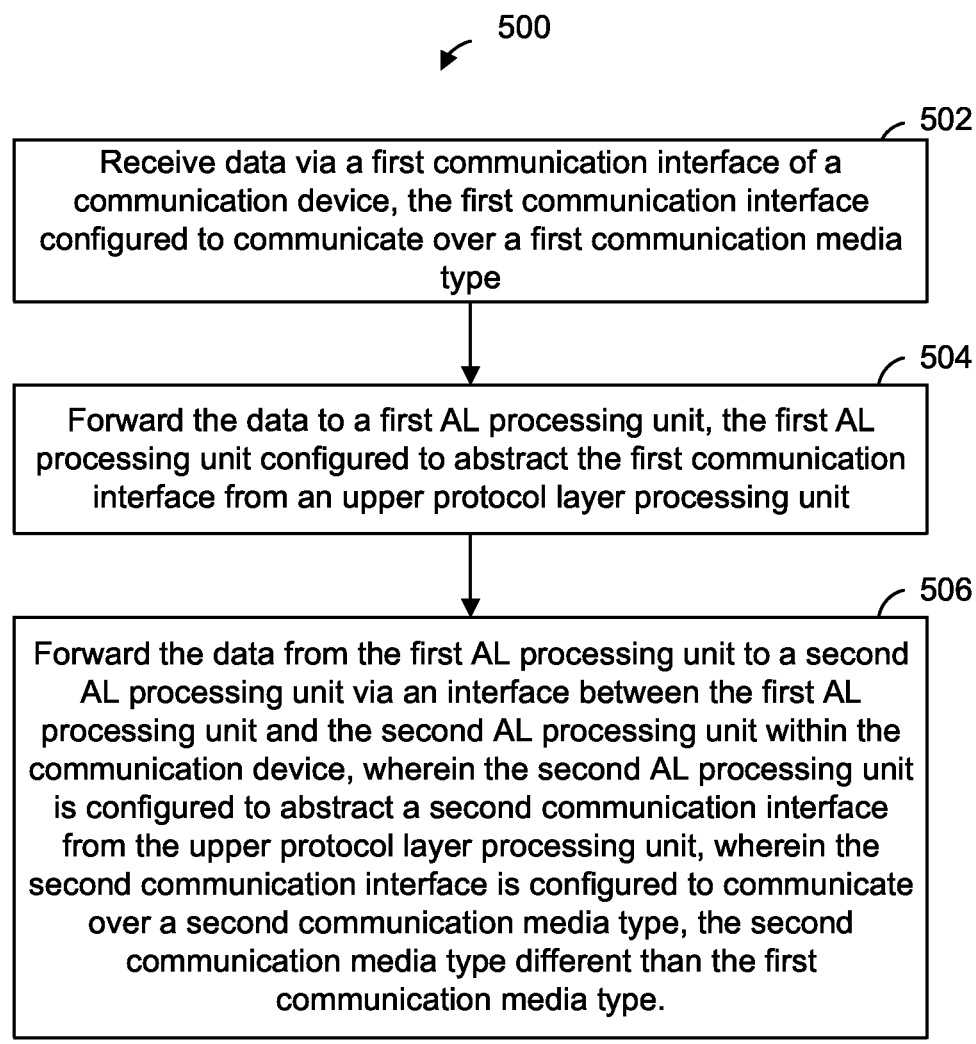
FIG. 5 is a flow diagram of an example method for operating a plurality of disparate communication interfaces within a communication device, according to an embodiment.

FIG. 5 is a flow diagram of an example method 500 of processing data in a communication device operating in a heterogeneous communication network, according to an embodiment. With reference to FIG. 1, the method 500 is implemented by the gateway 12, in an embodiment. With continued reference to FIG. 1, in another embodiment, the method 500 is implemented by a client device 14 (e.g., the client device 14-1). As another example, referring to FIGS. 2 and 3, the method 500 is implemented by the communication device 100. For example, the method 500 is implemented by the interface 102-1 and the AL processing unit 108-1, in an embodiment. In other embodiments, the method 500 is implemented by other suitable communication devices. For ease of explanation, the method 500 is described below as being performed by the communication device 100 of FIGS. 2 and 3.

At block 502, data is received via a first communication interface of a communication device. For example, data is received over the communication interface 102-1 of the communication device 100, in an embodiment. In other embodiments, data is received via a different communication interface of the communication device 100 (e.g., the communication interface 102-2) or over a communication interface in a communication device other than the communication device 100. In an embodiment, the first communication interface is configured to communicate over a first communication media type. For example, the first communication interface is configured to communicate over a one of (i) a wireless connection, such as a WLAN connection, or (ii) a wired connection, such as an Ethernet connection or a powerline connection, for example.

At block 504, the data is forwarded to a first AL processing unit. For example, data is forwarded to the AL processing unit 108-1 of the communication device 100, or to another AL processing unit, in an embodiment. The first AL processing unit is configured to abstract operation of the first communication interface from an upper protocol layer processing unit in the communication device. For example, the AL processing units is configured to abstract operation of the first communication interface from an LLC layer, or from another protocol layer, of the communication device.

At block 506, the data is forwarded from the first AL processing unit to a second AL processing unit via an interface between the first AL processing unit and the second AL processing unit within the communication device. As an example, referring to the communication device 100 of FIGS. 2 and 3, the data is forwarded from the AL processing unit 108-1 to the AL processing unit 108-2 via the M-AL SAP 116-1, in an embodiment. In other embodiments, data is forwarded from the first AL processing unit to the second AP processing unit via other suitable interfaces that allow communication between multiple AL processing units within the communication device. In an embodiment, the second AL processing unit is configured to abstract a second communication interface from the upper protocol layer processing unit. The second communication interface is configured to communicate over a second communication media type, different than the first communication media type, in an embodiment. For example, the second communication protocol is configured to communicate over the other one of (i) a wireless connection, such as a WLAN connection, or (ii) a wired connection, such as an Ethernet connection or a powerline connection, in an embodiment.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A communication device, comprising:
    a plurality of communication interfaces, each communication interface configured to operate according to a respective communication protocol; and
    a plurality of abstraction layer (AL) processing units, each AL processing unit coupled to a respective communication interface of the plurality of communication interfaces, wherein each AL processing unit is configured to abstract the corresponding communication protocol from an upper layer processing unit, and wherein each AL processing unit includes i) a respective first interface for communicating with the respective communication interface and ii) a respective second interface for communicating with other AL processing units within the communication device.

2. The communication device of claim 1, wherein each AL processing unit of the plurality of AL processing units is configurable to operate either (i) in master mode or (ii) in slave mode with respect to the other AL processing units within the communication device.

3. The communication device of claim 2, wherein a first AL processing unit of the plurality of processing units is configured to operate in master mode and a second AL processing unit of the plurality of processing units is configured to operate in slave mode, wherein the first AL processing unit supports a set of control messages and the second AL processing unit supports a subset of the set of control messages supported by the first AL processing unit.

4. The communication device of claim 3, further comprising a central database accessible by each AL processing unit of the plurality of AL processing units, wherein the database stores at least (i) forwarding data and (ii) link data describing quality of active links associated with the communication device.

5. The communication device of claim 4, wherein the first AL processing unit includes the database.

6. The communication device of claim 3, further comprising an arbitration unit configured to (i) select, from the plurality of communication interfaces, a communication interface via which to transmit data received from the higher level processing unit and (i) cause the data to be forwarded to the AL processing unit associated with the selected communication interface.

7. The communication device of claim 6, wherein the first AL processing unit includes the arbitration module.

8. The communication device of claim 1, wherein the upper protocol layer is a logical data link layer.

9. An apparatus for communication in a heterogeneous network, the heterogeneous network including a plurality of disparate communication media types, the apparatus comprising:
    a communication interface configured for communication over one of the communication media types; and
    an abstraction layer (AL) processing unit coupled to the communication interface, the AL processing unit configured to abstract the communication interface from an upper layer processing unit in a communication device, wherein the AL processing unit includes i) a first interface for communicating with the communication interface and ii) a second interface for communicating with other AL processing units within the communication device.

10. The apparatus of claim 9, wherein the AL processing unit is configurable to operate in a master mode or in a slave mode within the communication device.

11. The apparatus of claim 10, wherein
    when the AL processing unit is configured to operate in a master mode, the AL processing unit supports a set of control messages, and
    when the AL processing unit is configured to operate in the slave mode, the AL processing unit supports a subset of the set of control messages.

12. The apparatus of claim 10, wherein the AL processing unit further comprises an arbitration module configured to arbitrate operation of a plurality of AL processing units within the communication device, wherein the arbitration module is (i) enabled when the AL processing unit is configured to operate in the master mode and (ii) disabled when the AL processing unit is configured to operate in the slave mode.

13. The apparatus of claim 9, wherein the upper protocol layer is a logical data link layer.

14. A communication device, comprising:
    a plurality of communication interfaces, each communication interface configured to operate according to a respective communication protocol;
    a plurality of abstraction layer (AL) processing units, each AL processing unit coupled to a respective communication interface of the plurality of communication interfaces, wherein each AL processing unit is configured to abstract the corresponding communication protocol from an upper layer processing unit, and wherein each AL processing unit includes a respective interface for communicating with other AL processing units within the communication device; and a central database accessible by each AL processing unit of the plurality of AL processing units, wherein the database stores at least (i) forwarding data and (ii) link data describing quality of active links associated with the communication device.

15. The communication device of claim 14, wherein a first AL processing unit among the plurality of AL processing units includes the database.

16. An apparatus for communication in a heterogeneous network, the heterogeneous network including a plurality of disparate communication media types, the apparatus comprising:

a communication interface configured for communication over one of the communication media types; and an abstraction layer (AL) processing unit coupled to the communication interface, the AL processing unit configured to abstract the communication interface from an upper layer processing unit in a communication device, wherein the AL processing unit includes i) an interface for communicating with other AL processing units within the communication device, and ii) a central database accessible by other AL processing units within the communication device, the central database configured to store at least (a) forwarding data and (b) link data describing quality of active links associated with the communication device.

17. The apparatus of claim 16, wherein the AL processing unit is configurable to operate in a master mode or in a slave mode within the communication device.

18. The apparatus of claim 17, wherein the central database is (i) enabled when the AL processing unit is configured to operate in the master mode and (ii) disabled when the AL processing unit is configured to operate in the slave mode.

* * * * *